United States Patent
Soares, Jr. et al.

(10) Patent No.: US 10,024,187 B2
(45) Date of Patent: Jul. 17, 2018

(54) GAS TURBINE ENGINE HEALTH DETERMINATION

(71) Applicant: General Electric Company, Schenectady, NY (US)

(72) Inventors: Alvaro Jose Soares, Jr., Lowell, MA (US); David Joseph McKenna, Kinston, NC (US); Marta Katarzyna Asack, East Bridgewater, MA (US)

(73) Assignee: General Electric Company, schenectady, NY (US)

( * ) Notice: Subject to any disclaimer, the term of this patent is extended or adjusted under 35 U.S.C. 154(b) by 31 days.

(21) Appl. No.: 14/924,928

(22) Filed: Oct. 28, 2015

(65) Prior Publication Data

US 2016/0273379 A1  Sep. 22, 2016

Related U.S. Application Data

(60) Provisional application No. 62/136,162, filed on Mar. 20, 2015.

(51) Int. Cl.
*F01D 21/00* (2006.01)
*B64F 5/60* (2017.01)
(Continued)

(52) U.S. Cl.
CPC ........... *F01D 21/003* (2013.01); *B64D 45/00* (2013.01); *B64F 5/60* (2017.01); *G05B 23/0254* (2013.01);
(Continued)

(58) Field of Classification Search
CPC ..... F01D 21/003; B64F 5/60; G05B 23/0254; G05B 23/0294; B64D 45/00
See application file for complete search history.

(56) References Cited

U.S. PATENT DOCUMENTS

| 4,894,782 A | 1/1990 | Alcock et al. |
| 5,161,364 A | 11/1992 | Bruun et al. |

(Continued)

FOREIGN PATENT DOCUMENTS

| CN | 101858826 A | 10/2010 |
| CN | 102963533 A | 3/2013 |

(Continued)

OTHER PUBLICATIONS

European Search Report and Written Opinion issued in connection with corresponding EP Application No. 16161239.5 dated Jul. 27, 2016.

(Continued)

*Primary Examiner* — Basil T. Jos
(74) *Attorney, Agent, or Firm* — General Electric Company; Pamela Kachur

(57) ABSTRACT

A method is provided for determining an updated engine health factor of an aircraft engine. The method includes determining an engine health condition indicative of an engine health during operation of the aircraft engine. The method also includes determining a baseline engine power model for the aircraft engine and modifying the baseline engine power model using the determined engine condition. The method also determines an engine health factor based on a modified engine power model.

20 Claims, 8 Drawing Sheets

(51) Int. Cl.
B64D 45/00 (2006.01)
G05B 23/02 (2006.01)

(52) U.S. Cl.
CPC .. *G05B 23/0294* (2013.01); *B64D 2045/0085* (2013.01); *F05D 2220/323* (2013.01); *F05D 2220/329* (2013.01); *F05D 2260/80* (2013.01)

(56) References Cited

U.S. PATENT DOCUMENTS

| | | |
|---|---|---|
| 5,177,951 A | 1/1993 | Butler |
| 5,213,283 A | 5/1993 | Gold et al. |
| 5,452,207 A | 9/1995 | Hrovat et al. |
| 6,141,951 A | 11/2000 | Krukoski et al. |
| 6,449,565 B1 | 9/2002 | Budrow et al. |
| 7,219,040 B2 | 5/2007 | Renou et al. |
| 7,714,702 B2 | 5/2010 | Khuzadi |
| 7,822,512 B2 | 10/2010 | Thatcher et al. |
| 7,844,404 B2 | 11/2010 | Ling et al. |
| 8,033,118 B2 | 10/2011 | Monteiro et al. |
| 8,322,145 B2 | 12/2012 | Snider et al. |
| 8,386,121 B1 | 2/2013 | Simon et al. |
| 8,682,509 B2 | 3/2014 | Goodrich et al. |
| 8,909,453 B2 | 12/2014 | Wendelsdorf et al. |
| 8,967,528 B2 | 3/2015 | Mackin et al. |
| 2009/0112340 A1 | 4/2009 | Shen |
| 2010/0057277 A1 | 3/2010 | Goodrich et al. |
| 2010/0168931 A1 | 7/2010 | Nasle |
| 2013/0096699 A1 | 4/2013 | Sundaram et al. |
| 2014/0163838 A1 | 6/2014 | Moeckly et al. |
| 2014/0236534 A1* | 8/2014 | Ling .................. G05B 23/024 702/182 |
| 2014/0271114 A1 | 9/2014 | Phillips et al. |
| 2014/0365036 A1* | 12/2014 | Moeckly .................. F02C 9/00 701/3 |
| 2015/0019185 A1 | 1/2015 | Cunningham et al. |
| 2015/0369138 A1* | 12/2015 | Phillips .................. F02C 7/32 701/100 |

FOREIGN PATENT DOCUMENTS

| | | |
|---|---|---|
| CN | 103429876 A | 12/2013 |
| CN | 103489032 A | 1/2014 |
| EP | 2740916 A | 6/2014 |
| GB | 2516080 A | 1/2015 |
| JP | 2001-020760 A | 1/2001 |
| JP | 2003-027961 A | 1/2003 |
| JP | 2006-291762 A | 10/2006 |
| JP | 2011-102548 A | 5/2011 |
| JP | 2016-528874 A | 9/2016 |
| WO | 2014/009634 A1 | 1/2014 |
| WO | 2014122013 A1 | 8/2014 |

OTHER PUBLICATIONS

Soares et al., "Automated Power Assurance Refinement for a Turboshaft Engine," pp. 1-8. Presented at the AHS 71st Annual Forum, Virginia Beach, Virginia, May 5-7, 2015; American Helicopter Society International, Inc.

Nicholas Mackos, Brian LeFevre, Jason Friel, and Treven Baker, "Propulsion System Diagnostic and Reasoning Technology Development," *Proceedings of the American Helicopter Society 70$^{th}$ Annual Forum*, Montreal, Quebec, Canada, May 20-22, 2014.

Bandy, I., Davis, M. Cotter, J., Thompson, B., "Health Management Technology Integration and Verification," Proceedings of the American Helicopter Society AHS 71st Annual Forum, Virginia Beach, VA, May 2015.

Japanese Search Report issued in connection with corresponding JP Application No. 2016-049074 dated Feb. 10, 2017.

First Office Action issued in connection with corresponding CN Application No. 201610155236.1 dated Mar. 21, 2017.

Notification of Reasons for Refusal issued in connection with corresponding JP Application No. 2016-049074 dated Apr. 4, 2017.

\* cited by examiner

GAS TURBINE ENGINE HEALTH DETERMINATION

PRIORITY CLAIM

The present application is a non-provisional patent application claiming the benefit of and priority to U.S. Provisional Patent Application No. 62/136,162, filed Mar. 20, 2015, which is incorporated herein by reference for all purposes.

FEDERALLY SPONSORED RESEARCH

This invention was made with government support under contract number W911W6-10-2-0006 of the U.S. Army. The government may have certain rights in the invention.

FIELD OF THE INVENTION

The present subject matter relates generally to a method for assessing a health of a gas turbine engine, or more particularly to a method for determining a health factor of a gas turbine engine.

BACKGROUND OF THE INVENTION

An aircraft turbine engine generally includes a core having, in serial flow order, a compressor section, a combustion section, a turbine section, and an exhaust section. One or more shafts may be provided to drivingly connect the turbine section to the compressor section, and optionally, to drivingly connect the turbine section to a load. When such an aircraft engine is incorporated into a rotary aircraft, such as a helicopter, the one or more shafts of the aircraft engine may be mechanically coupled to a main rotor of the rotary aircraft such that the main rotor may provide lift for the rotary aircraft.

Given the nature of air travel, it is generally desirable to ensure the aircraft engine is operating properly before and/or during flight, and to maintain or overhaul such aircraft engines before the aircraft engine degrades past a certain threshold. One measure of degradation of an aircraft engine is an engine torque factor of the engine. The engine torque factor refers to a ratio of a current maximum corrected torque available to a maximum corrected torque available to a nominal engine (e.g., of a typical new engine). When the engine torque factor drops below a certain threshold, it may be determined that the engine needs to be taken "off wing" and maintained or overhauled.

One way for determining an engine torque factor is by utilizing one or more baseline engine power models providing a correlation of a corrected engine temperature to corrected engine torque. The baseline engine power models are typically developed based on a nominal aircraft engine for the various stages of the nominal engine's degradation. However, it is not uncommon for a degradation of an aircraft engine to vary from that of the nominal engine (i.e., to degrade more quickly or more slowly). Accordingly, as the above described method for determining a particular engine's engine torque factor does not take into consideration how the particular engine is actually operating, the engine torque factor thresholds for determining when an engine should be taken off wing to be maintained and/or overhauled can be overly conservative. This may result in prematurely taking an aircraft engine off wing and unnecessary maintaining/overhauling such engine.

Therefore, a method for determining an engine torque factor specific to the particular aircraft engine would be useful. Further, a method for determining an engine torque factor capable of taking into consideration certain operating conditions and/or ambient conditions of the aircraft engine would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method is provided for determining an engine heath factor of an aircraft engine. The method includes determining, by one or more control devices, an engine condition indicative of an engine health during operation of the aircraft engine. The method also includes accessing, by the one or more control devices, a baseline engine power model for the aircraft engine, and modifying, by the one or more control devices, the baseline engine power model using the determined engine condition. The method also includes determining, by the one or more control devices, an engine health factor based on the modified engine power model.

In an exemplary embodiment of the present disclosure, a computing device is provided. The computing device includes one or more processors and at least one tangible non-transitory computer-readable medium, the computer-readable medium storing instructions that when executed by the processor perform operations. The operations include determining an engine condition indicative of an engine health of an aircraft engine during operation of the aircraft engine, and accessing a baseline engine power model for the aircraft engine. The operations additionally include modifying the baseline engine power model using the determined engine condition, and determining an engine health factor based on the modified engine power model.

In another exemplary aspect of the present disclosure, a method is provided for determining an engine heath factor of an aircraft engine. The method includes determining, by one or more control devices, one or more engine limit factors during operation of the aircraft engine and determining, by the one or more control devices, one or more ambient conditions. The method also includes correcting, by the one or more control devices, the one or more determined engine limit factors to a normalized condition and determining, by the one or more control devices, a baseline engine health factor using the determined engine limit factors corrected to the normalized condition. The method also includes modifying, by the one or more control devices, the determined baseline engine health factor to a real-time engine health factor based on the determined ambient conditions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
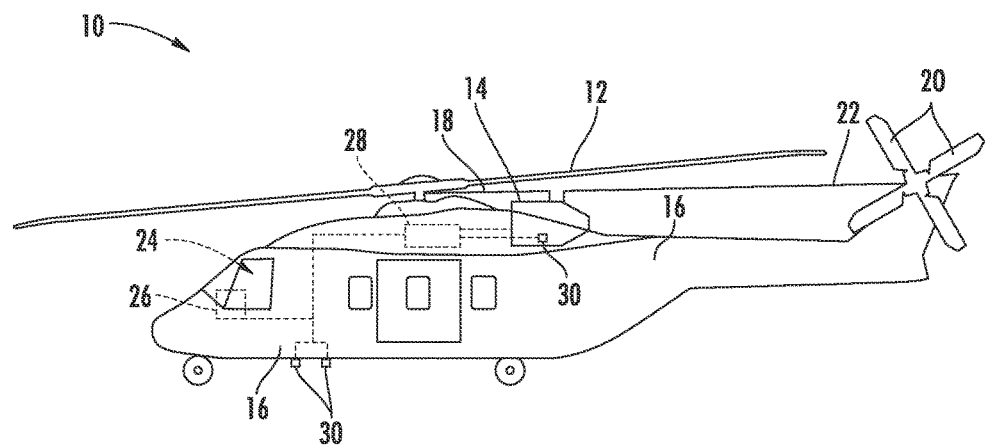
FIG. 1 is a side view of an aircraft according to an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

It may generally be beneficial for, e.g., a pilot or other aircrew member, or aircraft maintenance crew member, to have accurate engine health information of a specific aircraft engine of an aircraft. Particularly, it may be beneficial for a pilot or other aircrew member, or aircraft maintenance crew member, to know an engine torque factor specific to particular aircraft engine, as well as a maximum power available of the particular aircraft engine. The engine torque factor is generally defined as a ratio of a current maximum amount of torque available to a maximum amount of torque available to a nominal engine. The engine torque factor may generally be used to determine an amount of degradation of the engine, which may in turn be used to determine, e.g., when the engine needs to be taken off wing for maintenance. By contrast, the maximum power available factor of an aircraft engine refers to, e.g., a real-time maximum amount of shaft horsepower the engine is capable of producing. The maximum power available factor of the aircraft engine conveys to the pilot or other aircrew member how much power the particular engine can produce at that moment during flight.

Typically, the engine torque factor is estimated based on, e.g., an age of the engine. However, each individual engine may degrade at different rates, despite being the same make and model. Thus, a minimum engine torque factor threshold for determining when an engine needs to be repaired may generally be overly conservative. Accordingly, aspects of the present disclosure (see, e.g., FIG. 3) may measure one or more engine conditions indicative of an engine health during operation of the aircraft engine and adaptively update baseline models of a nominal engine. Such a method may have the technical effect of determining more accurate and tailored engine torque factor information for the particular aircraft engine in question.

Additionally, a maximum power available for an aircraft engine is typically determined by determining one or more engine limit factors during operation of the aircraft engine. These engine limit factors are corrected to a normal day condition (e.g., a predetermined altitude and a predetermined temperature). The corrected engine limit factors then determine the amount of power the aircraft is presently capable of producing (i.e., a maximum power available). However, if the engine is operating at conditions outside of the normal day condition, such as at high altitude and/or at a relatively high or low temperature, such a method may not accurately provide the pilot or other aircrew member with the desired information. Accordingly, aspects of the present disclosure (see, e.g., FIG. 7) may measure the real-time ambient conditions of the aircraft engine and modify the determined maximum power available in light of these real-time ambient conditions. Such a method may have the technical effect of providing more accurate maximum power available information to, e.g., the pilot or other aircrew member.

Referring now to the drawings, wherein identical numerals indicate the same elements throughout the figures, FIG. 1 depicts an aircraft, or more particularly, a rotary aircraft 10, also referred to as a helicopter, in accordance with an exemplary embodiment of the present disclosure.

The aircraft 10 depicted includes a main rotor 12 configured to generate lift for driving the helicopter 10. The main rotor 12 is driven by an engine 14, which is mounted on an engine mount (not shown) on a fuselage 16 of the aircraft 10. As will be discussed in greater detail below, the engine 14 is configured as a gas turbine engine, or more particularly, as a turboshaft engine. The engine 14 is configured to drive the rotor 12 through a drive shaft 18.

Turning the main rotor 12 generates the lift for driving the aircraft 10. In addition, however, the main rotor 12 also applies a reverse torque that spins helicopter fuselage 16 in an opposite direction relative to a direction of rotation of the rotor 12. In certain embodiments, a tail rotor 20 is mounted at the rear of the aircraft 10 for counter-acting the torque generated by the rotor 12. For the embodiment depicted, a portion of the engine 14 power is also utilized to drive the tail rotor 20 through a drive shaft 22.

A cockpit 24—located at a forward end of the fuselage 16 of the aircraft 10—is provided for housing one or more pilots or other aircrew members of the aircraft 10. The one or more aircrew members may manipulate a plurality of controls 26 within the cockpit 24 to operate the aircraft 10 and/or engine 14. The controls 26 may include, e.g., one or more pedals, control sticks, levers, etc. Moreover, the cockpit 24 may also include gauges or other displays to provide the one or more aircrew members with information regarding the aircraft 10 and/or engine 14. For the embodiment depicted, control of one or more aspects of the aircraft 10 may be assisted by a controller 28 (see also FIG. 9). The controller 28 may be operably connected to, e.g., the controls 26 located within the cockpit 24 of the aircraft 10, as well as to a plurality of sensors 30 in/on the engine 14 and aircraft 10. The plurality of sensors 30 may include, e.g., ambient conditions sensors, such as temperature, pressure, and altitude sensors, as well as engine condition sensors for sensing one or more conditions of the engine 14.

Figure 2:
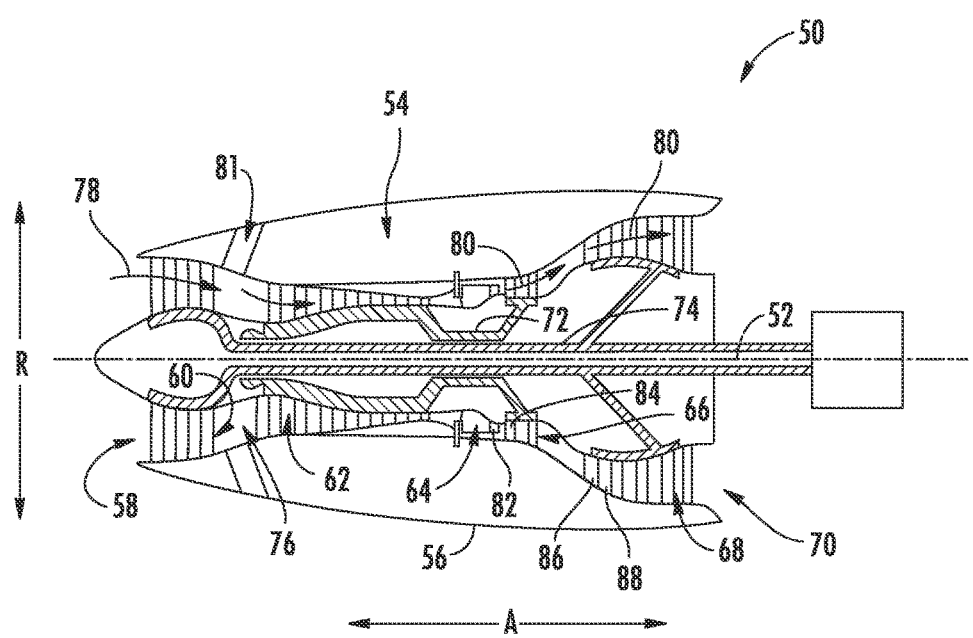
FIG. 2 is a schematic cross-sectional view of an exemplary gas turbine engine according to an exemplary embodiment of the present disclosure.

Referring now to FIG. 2, a schematic cross-sectional view of a gas turbine engine in accordance with an exemplary embodiment of the present disclosure is provided. More particularly, for the embodiment of FIG. 2, the gas turbine engine is a turboshaft engine 50, referred to herein as "turboshaft engine 50." In at least certain exemplary embodiments, the turboshaft engine 50 depicted in FIG. 2 may be incorporated into the aircraft 10 described above with reference to FIG. 1 as the exemplary engine 14. Alternatively, however, the turboshaft engine 50 may be incorporated into any other suitable aircraft.

As shown in FIG. 2, the turboshaft engine 50 defines an axial direction A (extending parallel to a longitudinal centerline 52 provided for reference) and a radial direction R. In general, the turboshaft 10 includes a core turbine engine 54 disposed inside a substantially tubular outer casing 56 that defines an annular inlet 58. The outer casing 56 encases, in serial flow relationship, a compressor section including a booster or low pressure (LP) compressor 60 and a high pressure (HP) compressor 62; a combustion section 64; a turbine section including a high pressure (HP) turbine 66 and a low pressure (LP) turbine 68; and an exhaust section 70. A high pressure (HP) shaft or spool 72 drivingly connects the HP turbine 66 to the HP compressor 62. A low pressure (LP) shaft or spool 74 drivingly connects the LP turbine 68 to the LP compressor 60. The compressor section, combustion section 64, turbine section, and nozzle section 70 together define a core air flowpath 76.

During operation of the turboshaft engine 50, a volume of air 78 enters the core air flowpath 76 through the inlet 58, and is provided to the LP compressor 60. A pressure of the air 78 is increased as it is routed through LP compressor 60 and the HP compressor 62. The air 78 exits the HP compressor 62 and flows into the combustion section 64, where the high-pressure air 78 is mixed with fuel and burned to provide combustion gases 80. Alternatively, as is depicted, at least a portion of the air 78 in the compressor section may flow through one or more bypass passages 81. For the embodiment depicted, the bypass passages 81 are located downstream from the LP compressor 60 and upstream from the HP compressor 62. However, in other exemplary embodiments, the bypass passages 81 may additionally, or alternatively, be located at any other suitable location within the turboshaft engine 50.

The combustion gases 80 are then routed through a turbine inlet into the HP turbine 80 where a portion of thermal and/or kinetic energy from the combustion gases 80 is extracted via sequential stages of HP turbine stator vanes 82 that are coupled to the outer casing 56 and HP turbine rotor blades 84 that are coupled to the HP shaft or spool 72. Such a configuration causes the HP shaft or spool 72 to rotate, thereby supporting operation of the HP compressor 62. The combustion gases 80 are then routed through the LP turbine 68 where a second portion of thermal and kinetic energy is extracted from the combustion gases 80 via sequential stages of LP turbine stator vanes 86 that are coupled to the outer casing 56 and LP turbine rotor blades 88 that are coupled to the LP shaft or spool 74. Such a configuration causes the LP shaft or spool 74 to rotate, thereby supporting operation of the LP compressor 60. The combustion gases 80 are subsequently routed through the exhaust section 70.

As is also depicted, the LP shaft 74 extends aft of the core 54 to provide rotational power to a load 90. For example, in certain exemplary aspects, the load 90 may be a main rotor 12 of an aircraft 10 and/or a tail rotor 22 of an aircraft (see FIG. 1) mechanically coupled via one or more driveshafts, gearboxes, etc.

Additionally, although not depicted, it should be appreciated that the turboshaft engine 50 may include one or more sensors to monitor certain conditions of the engine 50. For example, the turboshaft engine 50 may include one or more temperature sensors configured for sensing a temperature in the compressor section or turbine section, such as at an inlet of the turbine section. Additionally, the turboshaft engine 50 may include pressure sensors for sensing a pressure in the compressor section, sensors for determining an amount of airflow through the bypass passages 81, sensors for determining a rotational speed of one or more of the shafts, such as the HP shaft 72 and/or LP shaft 74, etc.

Moreover, it should be appreciated, that the exemplary turboshaft engine 50 depicted in FIG. 1 is provided by way of example only, and that in other exemplary embodiments, the turboshaft engine 50 may have any other suitable configuration. For example, in certain exemplary embodiments, the turboshaft engine 50 may not include the LP compressor 60, and thus, the LP turbine 68 may only support rotation of the LP shaft 74 to provide rotational power to the load 90. Additionally, the turboshaft engine 10 may include various actuators, guide vanes, ports, etc. not described herein or depicted in FIG. 2. Further, in still other exemplary embodiments, the turboshaft engine 50 may instead be configured as any other suitable gas turbine engine incorporated into any other suitable aircraft, such as a fixed wing aircraft, or any other form of, e.g., land vehicle or marine vehicle. For example, in other exemplary embodiments, aspects of the present disclosure may be used in conjunction with, e.g., a turbofan engine, turboprop engine, turbocore engine, turbojet engine, etc.

Figure 3:
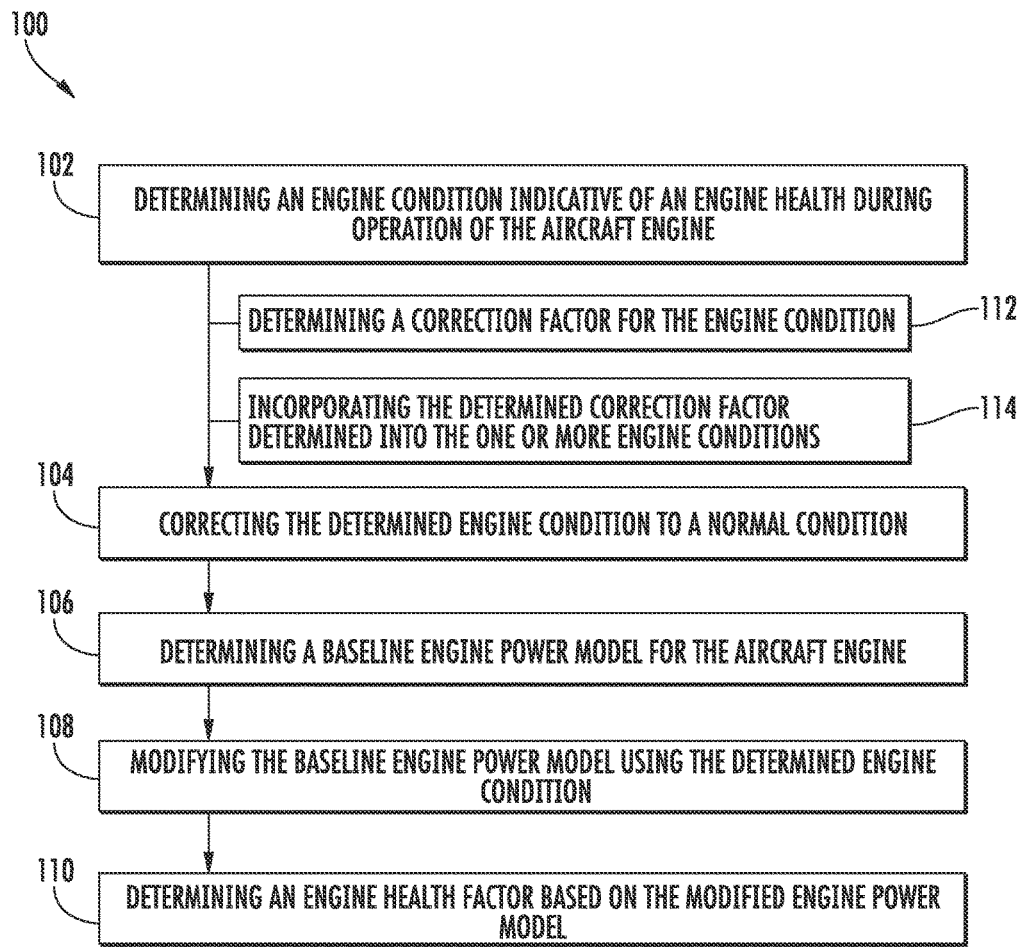
FIG. 3 is a flow diagram of a method for determining an engine health factor in accordance with an exemplary aspect of the present disclosure.

Referring now to FIG. 3, a flow diagram is provided of a method (100) for determining an engine health factor of a specific aircraft engine. Specifically, the exemplary method (100) of FIG. 3 may determine an engine torque factor specific/tailored to a particular aircraft engine. In certain exemplary aspects, the method (100) of FIG. 3 may be utilized with, e.g., the aircraft 10 of FIG. 1 and/or the gas turbine engine 50 of FIG. 2. However, in other exemplary aspects, the method (100) of FIG. 3 may additionally, or alternatively, be utilized with any other suitable aircraft and/or gas turbine engine.

The method (100) generally includes at (102) determining an engine condition indicative of an engine health during operation of the aircraft engine. For example, the engine condition determined at (102) during operation of the aircraft engine may include a current torque value and a corresponding current engine temperature value. The current engine temperature value may be a temperature at an inlet of a turbine section of the engine, sometimes referred to as the Turbine Gas Temperature (TGT).

In certain exemplary aspects, the engine condition determined at (102) may include a plurality of engine condition values. For example, the engine condition determined at (102) may include a plurality of current engine torque values and corresponding current engine temperature values. The plurality of these engine condition values may be determined throughout operation of the engine, such as throughout a flight of an aircraft to which the engine mounted.

The method (100) further includes at (104) correcting the determined engine condition(s) to a normalized condition. For example, the method (100) may at (104) correct the determined engine torque values and corresponding engine temperature values to values corresponding to a normal day condition. Accordingly, correcting the determined engine conditions at (104) may include sensing or otherwise determining certain ambient conditions (e.g., an ambient temperature and/or pressure) and normalizing the determined engine torque values and corresponding engine temperature values to engine torque values and engine temperature values corresponding to flight at a predetermined altitude and a predetermined temperature (i.e., "corrected engine torque values" and "corrected engine temperature values").

Figure 4:
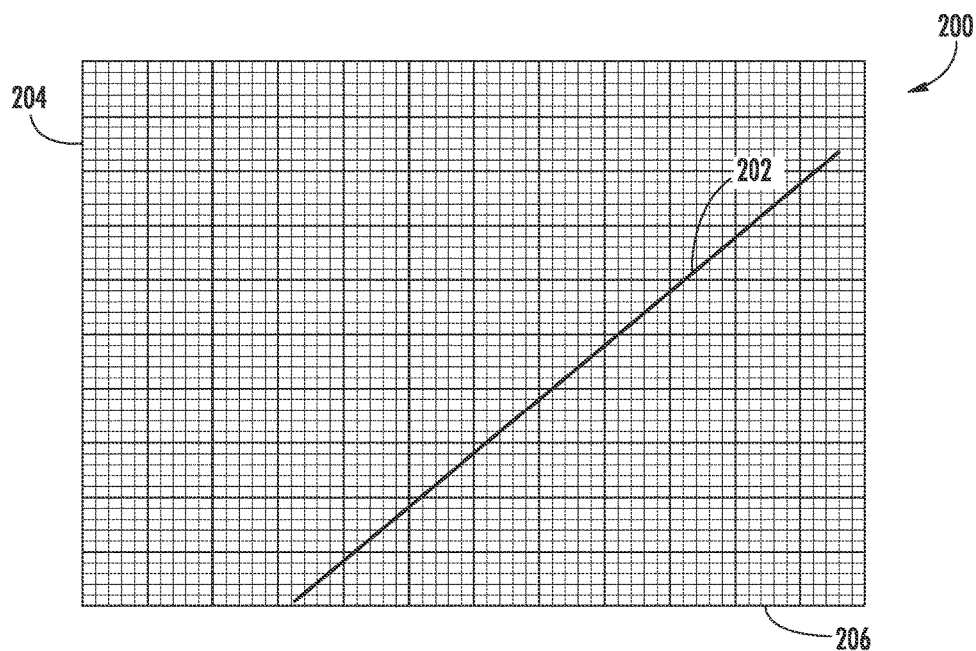
FIG. 4 is a baseline engine power model in accordance with an exemplary aspect of the present disclosure.

Referring still to FIG. 3, and now also to FIG. 4, the method (100) further includes at (106) accessing a baseline engine power model for the aircraft engine. FIG. 4 provides an exemplary baseline engine power model 200 for an aircraft engine in accordance with an exemplary aspect of the present disclosure. For the exemplary aspect depicted, the baseline power model 200 is an engine torque to engine temperature model, or more particularly, a corrected engine torque to corrected engine temperature model. The corrected engine torque to corrected engine temperature model may be selected based on an anticipated amount of degradation of the engine. For example, the amount of degradation of the engine may be anticipated based on an age of the engine.

As shown in FIG. 4, the exemplary baseline engine power model 200 generally includes an engine line 202 depicting a relationship between corrected torque (Y-axis, 204) and corrected temperature (X-axis, 206) value. The engine line 202 of the baseline engine power model 200 is determined based on a nominal engine. At a maximum corrected temperature of the engine, a maximum corrected torque for the engine may be determined. A baseline engine torque factor may then be determined by dividing the maximum corrected torque determined using the baseline engine power model 200 by a maximum corrected torque of a nominal engine. Notably, however, an engine torque factor determined in such a manner does not take into consideration how the specific engine is operating. For example, an engine torque factor determined in such a manner does not take into consideration whether or not the particular engine is degrading more quickly or more slowly than the nominal or typical engine. Aircrew members or aircraft maintenance members would thus need to conservatively estimate when the aircraft engine must be taken off wing to be repaired or maintained based on an engine torque factor determined in such a manner.

Figure 5:
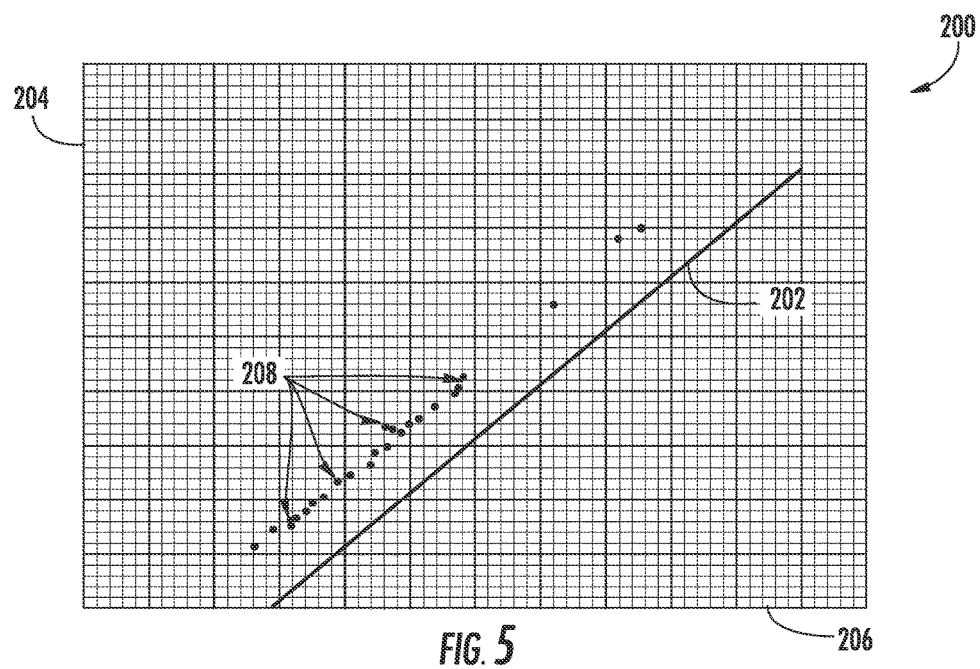
FIG. 5 is the baseline engine power model of FIG. 4, having a plurality of engine conditions plotted thereon.
Figure 6:
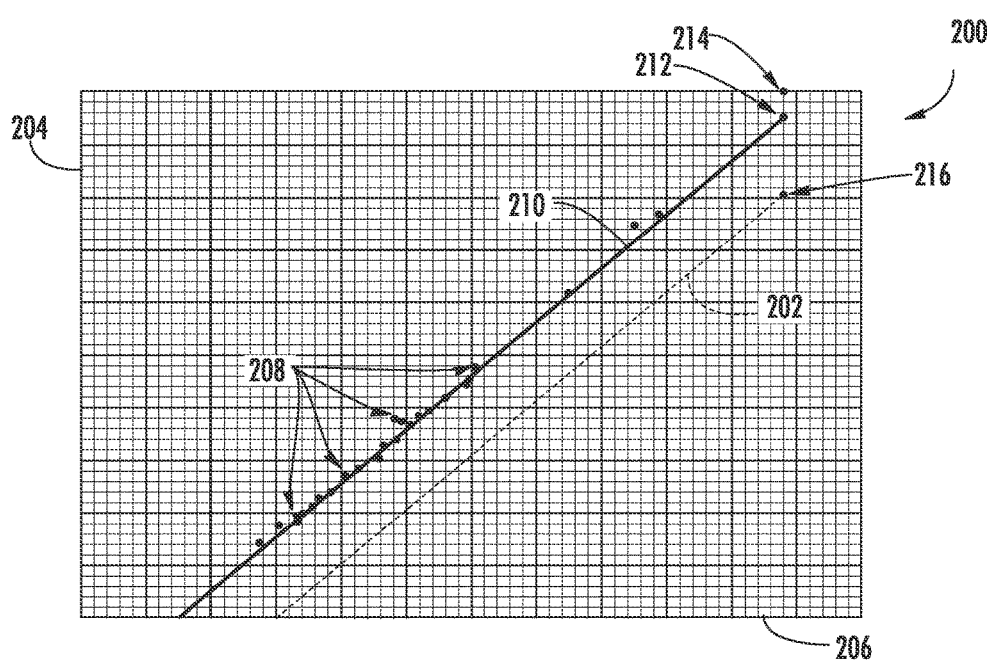
FIG. 6 is a modified engine power model in accordance with an exemplary aspect of the present disclosure.

Accordingly, referring now also to FIGS. 5 and 6, the exemplary method (100) further includes at (108) modifying the baseline engine power model 200 using the engine conditions determined at (102) and corrected at (104) to the normalized condition. For example, in certain exemplary aspects, modifying the baseline engine power model at (108) may include modifying the baseline engine power model using the plurality of engine condition values, such as the plurality of corrected torque values and corresponding corrected engine temperature values. For example, FIG. 5 depicts the exemplary baseline engine power model 200 of FIG. 4 having the plurality of engine conditions determined at (102) and corrected at (104) added thereto (i.e., corrected torque values and corresponding corrected engine temperature values, labeled generally as 208). Specifically, for the embodiment depicted, modifying the baseline engine power model 200 at (108) includes plotting the plurality of engine conditions determined at (102) and corrected at (104) on the engine power model 200.

As is evident from FIG. 5, the exemplary engine conditions plotted thereon (numeral 208) do not align with the baseline engine line 202. The inventors of the present disclosure have determined that such a result correlates to the particular aircraft engine degrading differently than the nominal aircraft engine.

Accordingly, referring now particularly to FIG. 6, modifying the baseline engine power model at (108) also includes updating the baseline engine line 202 (depicted in phantom in FIG. 6) to an updated engine line 210 to reflect the plurality of engine conditions determined at (102) and corrected at (104). Specifically, modifying the baseline engine power model 200 at (108) includes adapting the baseline engine line 202 to fit the engine conditions determined at (102) and corrected at (104) for the particular aircraft engine. This results in the adaptive/updated engine line 210. In certain aspects, adapting the engine line 202 to fit the engine conditions determined for the particular aircraft engine (resulting in the updated engine line 210) may occur after flight, and/or after a sufficient number of engine condition values have been collected. Additionally, the engine line 202 may be adapted to the engine condition values determined at (102) and corrected at (104) using any suitable method. For example, the engine line 202 may be adapted to the engine condition values determined at (102) and corrected at (104) using a suitable linear regression formula, or any other suitable method.

The resulting updated engine line 210 (FIG. 6) may then be used to determine an updated or adaptive engine torque factor specific to the particular aircraft engine. For example, referring still to FIG. 3, the exemplary method (100) further includes at (110) determining an updated engine health factor, i.e., an updated engine torque factor, based on the engine power model modified at (108). In certain exemplary aspects, determining the adaptive engine torque factor at (110) may include extrapolating a maximum corrected engine torque available from the updated/adaptive engine line 210 of the engine power model 200 of FIG. 6, and dividing the maximum corrected engine torque available by the maximum nominal engine torque available. For the exemplary model depicted in FIG. 6, the maximum corrected engine torque available may correlate to point 212 and the maximum nominal engine torque available may correlate to point 214. Moreover, as stated for exemplary purposes, the baseline engine line 202 is depicted in phantom in FIG. 6. As is evident, using the baseline engine line 202 to determine the baseline maximum engine torque available (corresponding to point 216), would result in a much lower engine torque factor for the embodiment depicted.

A method in accordance with certain exemplary aspects of the present disclosure may therefore allow for a more tailored determination of a particular engine's engine torque factor, which may allow the engine to, e.g., operate for a longer period of time with less unnecessary maintenance and/or overalls.

It should be appreciated however, that the exemplary method (100) described above with reference to FIG. 3 is by way of example only. For example, although the exemplary method (100) described above utilizes a regression-based model approach, in other exemplary embodiments, any other suitable form of engine model may be used. For example, in other exemplary aspects, a physics-based model approach may be utilized. Additionally, in other exemplary aspects, the exemplary method (100) may instead be configured to determine any other suitable engine health factor based on any other suitable engine condition indicative of an engine health. For example, in other exemplary aspects, the exemplary method (100) may additionally, or alternatively, determine a temperature margin or factor as the engine health factor or a torque margin or factor as the engine health factor. In such exemplary aspects, the engine power models utilized with the exemplary method (100) may be any appropriate power model to determine the desired engine health factor. Moreover, in still other exemplary aspects, the engine health factor may be determined using one or more of the following engine conditions: a core speed of the aircraft engine, a fan speed of the aircraft engine (e.g., when used in conjunction with a turbofan gas turbine engine), a thrust of the aircraft engine, a compressor discharge pressure and/or temperature, a fuel flow, etc. In certain exemplary aspects, utilizing one or more of the above engine conditions may additionally include correcting such engine condition to a normalized condition, such as a normal day condition, and updating a baseline engine power model based on one or more of these corrected engine conditions.

Furthermore, it should be appreciated that certain operating conditions of the aircraft engine may affect the engine conditions determined at (102). For example certain operating conditions of the aircraft may shift one or more of the engine conditions determined at (102) up or down in value. For example, when the aircraft engine is, e.g., being used for icing operations, and/or is bleeding air from a compressor portion of the engine, the determined engine conditions may be skewed such that the engine condition determined may not be used to accurately represent an engine health without making a correction. Accordingly, in at least certain exemplary aspects, the method (100) may include correcting for such operating conditions to allow the method (100) to use the engine conditions determined at (102) despite sensing an operating condition that may affect the engine condition value.

Specifically, referring still to FIG. 3, the exemplary method includes at (112) determining a correction factor for the engine condition determined at (102) and at (114) incorporating the correction factor determined at (112) into the one or more engine conditions determined at (102). The correction factor determined at (112) may be the result of one or more sensed operating conditions of the engine. For example, in certain exemplary aspects, the correction factor may incorporate one or more of a current icing factor or a current bleed air factor. For example, the method (100) may include sensing with one or more sensors whether or not icing operations are taking place, and whether or not the aircraft engine is bleeding air. The correction factor determined at (112) may be a binary correction factor, such that the correction factor simply determines whether or not the icing operations are taking place, or whether or not the aircraft engine is bleeding air. Alternatively, the correction factor determined at (112) may be a measured icing or bleed air factor, such that the amount of correction is based on a sensed amount of icing or bleed air.

It should also be appreciated, however, that in other exemplary aspects, any other suitable correction factors may be determined at (112) and incorporated into the correction factor determined at (114). For example, in other exemplary aspects, the correction factor may include an actuator correction factor taking into consideration whether or not one or more actuators are being utilized, a transient operations correction factor, an inlet filter correction factor, an inlet door open/closed correction factor, an infrared suppression baffle position correction factor, etc.

Such an exemplary method may thus allow for accurately taking measurements and utilizing such measurements when operating the aircraft engine under cool conditions, such as during ambient conditions approaching freezing conditions, wherein icing operations may typically be initiated and utilizing aircraft engine resources.

Figure 7:
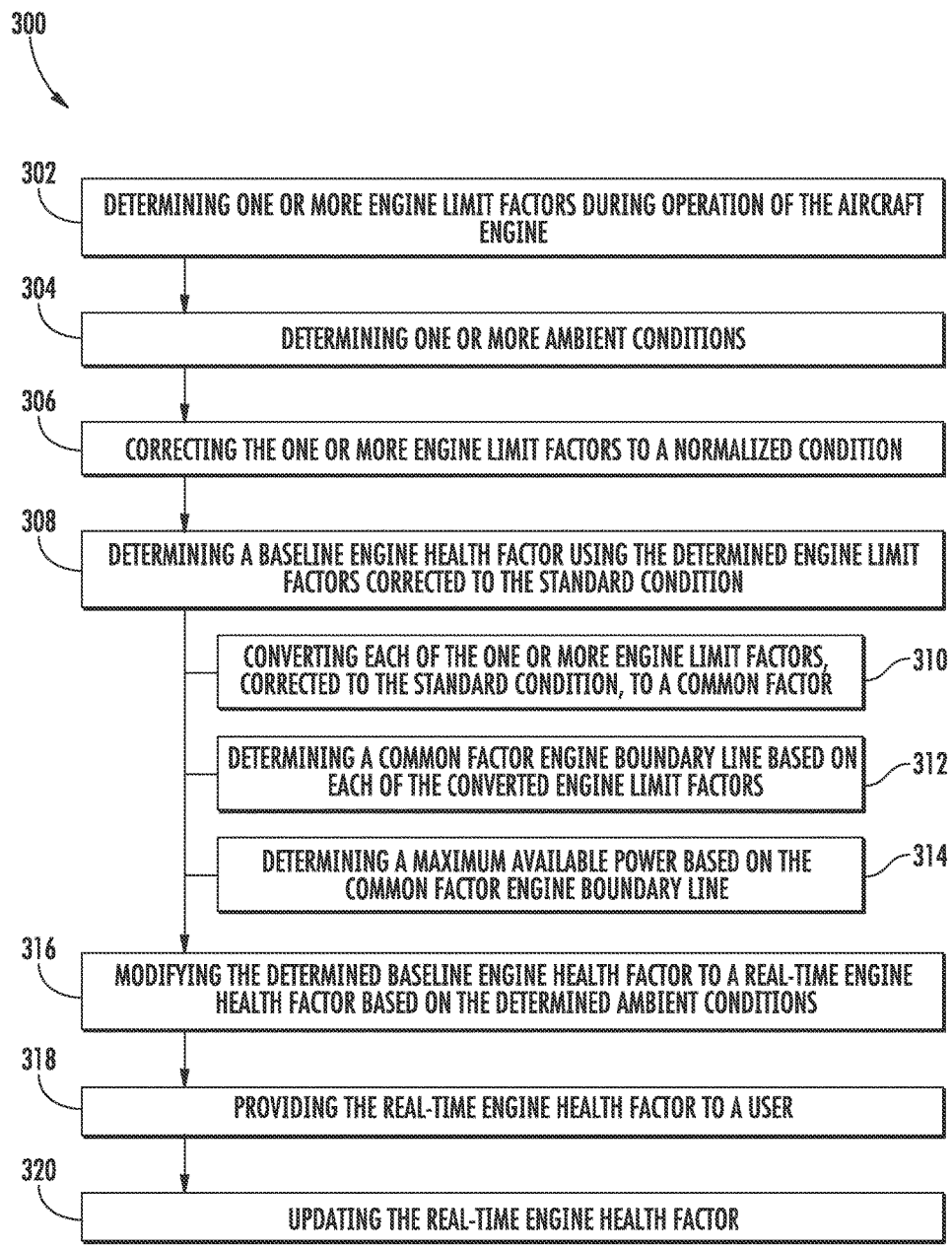
FIG. 7 is a flow diagram of a method for determining an engine health factor in accordance with another exemplary aspect of the present disclosure.

Referring now to FIG. 7, a flow diagram is provided of another method (300) for determining an updated engine health factor of an aircraft. Specifically, the exemplary method (300) of FIG. 7 provides for determining a more accurate, real-time maximum power available factor or value of the specific aircraft engine. Specifically, the exemplary method (300) of FIG. 7 may measure the real-time ambient conditions of the aircraft engine and modify a determined maximum power available in light of these real-time ambient conditions to provide more accurate maximum power available information to, e.g., the pilot or other aircrew member.

As depicted, the exemplary method (300) of FIG. 7 includes at (302) determining one or more engine limit factors during operation of the aircraft engine. For example, determining at (302) one or more engine limit factors may include determining one or more of a current torque of the engine, a current turbine inlet temperature of the engine (e.g., a TGT temperature), a current shaft speed of the engine, and a current shaft horsepower of the engine. One or more of these engine limit factors may be determined by sensing one or more engine conditions using appropriate sensors positioned in or on the aircraft engine.

Additionally, the exemplary method (300) includes at (304) determining one or more ambient conditions of the aircraft engine. For example, the one or more ambient conditions may include an ambient pressure, an ambient temperature, etc. In certain exemplary aspects, determining at (304) the one or more ambient conditions of the aircraft engine may include sensing the one or more ambient conditions of the aircraft engine using ambient conditions sensors positioned in or on the engine, or alternatively in or on an aircraft to which the engine is mounted.

Moreover, the exemplary method (300) includes at (306) correcting the one or more engine limit factors determined at (302) to a normalized condition. In at least certain exemplary aspects, correcting the one or more engine limit factors determined at (302) to a normalized condition at (306) includes correcting the one or more engine limit factors to a normal day condition based on the ambient conditions determined at (304). For example, correcting the one or more engine limit factors determined at (302) to a normalized condition at (306) may include correcting the engine limit factors to corresponding engine limit factors at a particular altitude and a particular temperature. However, in other exemplary aspects, the normalized condition may instead be any other suitable normalized condition.

Further, in at least certain exemplary aspects, correcting the one or more engine limit factors determined at (302) to a normalized condition at (306) may include correcting the one or more determined engine limit factors using lookup tables for a given deterioration level of the aircraft engine. Alternatively, correcting the one or more engine limit factors determined at (302) to a normalized condition at (306) may include utilizing models running at extrapolated limiting conditions.

The exemplary method (300) further includes at (308) determining a baseline engine health factor, which for the exemplary aspect depicted is a measure of a maximum power available, using the engine limit factors determined at (302) and corrected at (306) to a normalized condition. For example, the resulting corrected engine limit factors may each correspond to an engine model for determining a maximum power available.

Referring particularly to the exemplary aspect depicted, determining a baseline engine health factor at (308) includes at (310) converting each of the one or more engine limit factors determined at (302) and corrected to the normalized condition at (306) to a common factor. For example, in certain exemplary aspects, the one or more engine limit factors may include a current torque, a current turbine temperature, and a current shaft speed. Each of these engine limit factors may be corrected to normal day values and converted to a common factor, which in at least certain aspects, may be a corrected turbine engine temperature. With each of the one or more engine limit factors converted to a common factor at (310), e.g., a corrected turbine engine temperature, the exemplary method (300) includes at (312) determining a common factor engine boundary line based on each of the converted engine limit factors.

Figure 8:
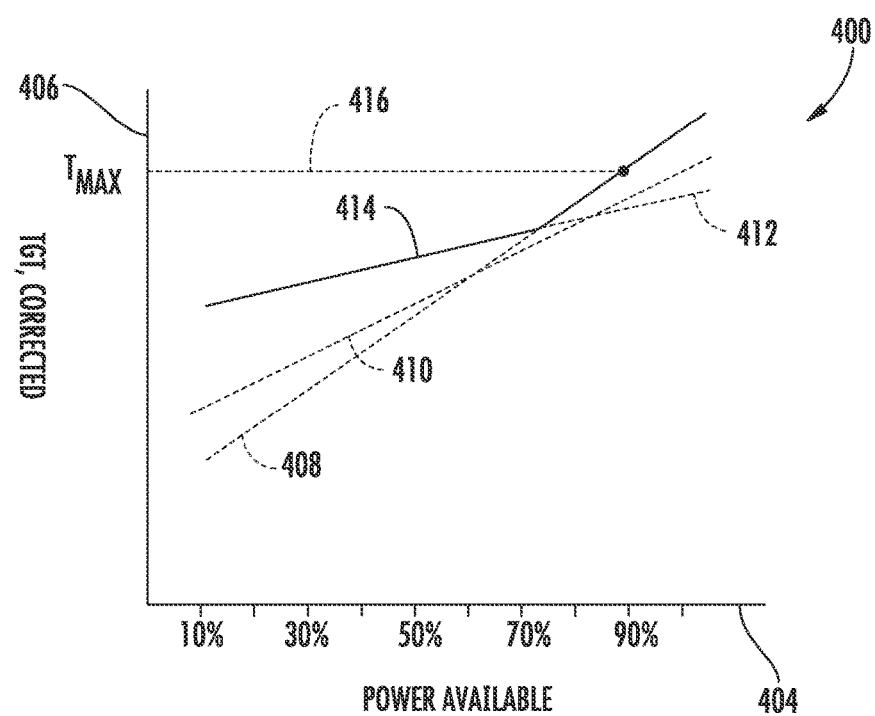
FIG. 8 is a power available model in accordance with an exemplary aspect of the present disclosure.

For example, referring now also to FIG. 8, a power available model 400 is depicted, which may be generated based on the engine limit factors determined at (302) and corrected at (306) to normalized conditions. The power available model 400 of FIG. 8 provides a relationship (i.e., an engine line) of a power available of the aircraft engine (X-axis, 404) to a corrected turbine engine temperature (Y-axis, 406). The converted engine limit factors may be combined to determine a turbine boundary line. For example, as depicted in phantom, line 408 may correspond to an engine line representative of the corrected turbine engine temperature value, line 410 may correspond to an engine line representative of a corrected engine torque value (converted to corrected turbine temperature), and line 412 may correspond to an engine line representative of a corrected core speed of the engine (also converted to corrected turbine temperature). As shown, the limits of each of these lines are combined to form a common factor engine boundary line 414.

Referring still to FIG. 7, for the aspect depicted, determining the baseline engine health factor at (308) further includes at (314) determining a maximum available power based on the common factor engine boundary line 414 determined at (312). For example, determining the maximum available power at (314) may include determining the maximum amount of power available before the common factor engine boundary line 414 reaches or exceeds a temperature limit for the aircraft engine. For the power available model 400 depicted in FIG. 8, the temperature limit of the particular aircraft engine is indicated by line 416. Accordingly, the maximum available power may be determined using the power available model 400 of FIG. 8 by determining a maximum power (X-axis) before exceeding the maximum corrected temperature (Y-axis), i.e., the temperature limit 416, for the particular aircraft engine. For the exemplary aspect depicted, the maximum power available would be approximately ninety percent, which is the highest power available on the x-axis before exceeding the temperature limit 416 (based on the common factor engine boundary line 414).

It should be appreciated, however, that in other exemplary embodiments, the maximum power available may instead be determined at (308) using corrected engine conditions in any other suitable manner. For example, although the exemplary aspect depicted in FIG. 7 utilizes a regression-based method to determine at (308) the baseline engine health factor, in other exemplary aspects the exemplary method (300) may utilize a physics-based model or any other suitable model/ method to determine at (308) the baseline engine health factor. Additionally, in other exemplary embodiments, any other suitable engine conditions may be determined and corrected to determine the maximum power available at (308).

Referring still to FIG. 7, however, the engine health factor determined at (308), i.e. the maximum power available, corresponds to normal day conditions (e.g., a particular altitude and a particular temperature). Accordingly, the maximum power available may not accurately represent the maximum power available given the actual ambient conditions of the aircraft engine. Accordingly, the exemplary method (300) includes at (316) modifying the engine health factor determined at (308) to a real-time engine health factor using the ambient conditions determined, e.g., at (304). More particularly, the exemplary method (300) includes correcting the maximum power available of the aircraft engine to a real-time maximum power available of the aircraft engine as may be appropriate given the current ambient conditions of the aircraft engine. Such an exemplary method may thus allow for more accurate real-time power available determinations to be made that are appropriate given the particular aircraft engine and the real-time ambient conditions of the aircraft engine. For example, when the aircraft engine is operated at a high-altitude and/or at relatively high or low ambient temperatures, the exemplary method (300) may provide for a more accurate real-time maximum power available determination.

Notably, the exemplary method (300) additionally includes at (318) providing the real-time engine health factor to a user of the aircraft engine, such as, e.g., a pilot or other aircrew member, and at (320) updating the real-time engine health factor at least once few seconds. For example, providing the real-time engine health factor at (318) to a user of the aircraft engine may include providing the real-time engine health factor to the user through one or more displays or gauges in a cockpit of the aircraft. Accordingly, the exemplary method (300) of FIG. 7 may provide real-time, up-to-date engine health factor information.

Figure 9:
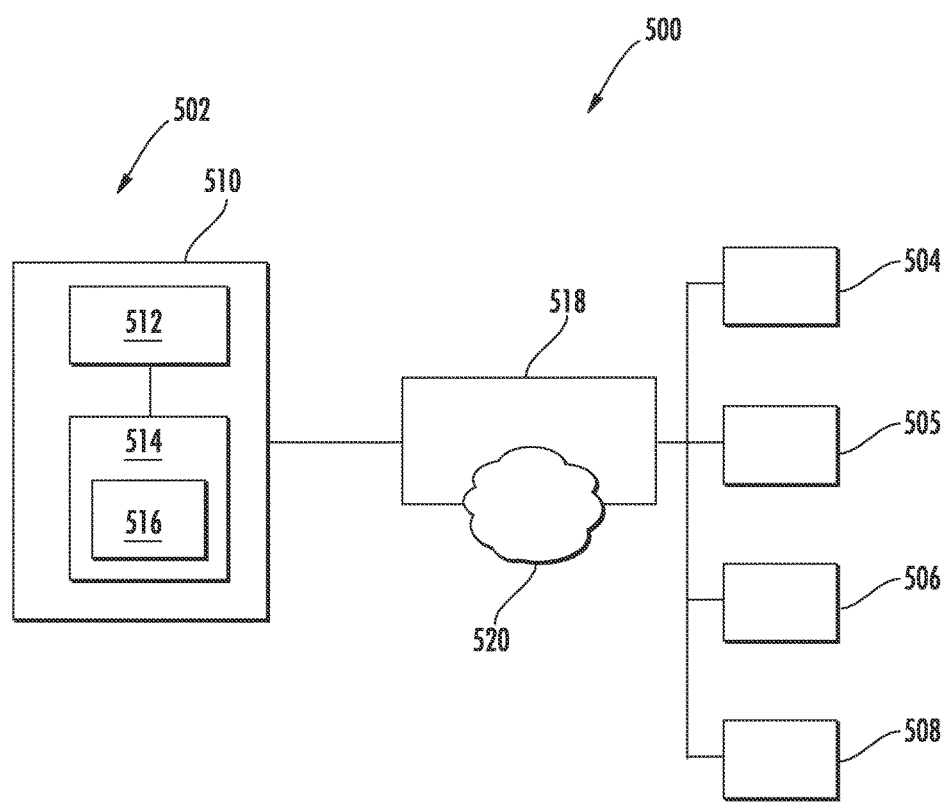
FIG. 9 is a schematic diagram of a system in accordance with an exemplary embodiment of the present disclosure.

Referring now to FIG. 9, an exemplary computer-based system 500 according to an exemplary embodiment of the present disclosure is provided. The exemplary system 500 may be configured to execute the exemplary method (100) described above with reference to FIG. 3 and/or the exemplary method (300) described above with reference to FIG. 7.

The system 500 of FIG. 9 includes a controller 502, such as the controller 28 of the exemplary aircraft 10 of FIG. 1. As depicted, the controller 502 is operably connected to one or more sensors 504, one or more aircraft controls 505, one or more user input devices 506, and one or more display devices 508. The one or more sensors 504 may include aircraft engine sensors positioned in or on the aircraft engine for determining one or more engine operating conditions. Additionally, or alternatively, the one or more sensors 504 may include ambient condition sensors located in or on an aircraft to which the aircraft engine is mounted for determining one or more ambient conditions of the aircraft engine. Moreover, the one or more aircraft controls 505 and user input devices 506 may include, e.g., aircraft controls located within a cockpit of an aircraft, or any other suitable user input device. Finally, the one or more display devices 508 may include gauges or display screens for providing information to a user of the system 500, such as a pilot or other aircrew member, or to an aircraft maintenance member. Additionally, or alternatively, the display devices 508 and/or user input devices 506 may include, e.g., maintenance equipment external to the aircraft engine and aircraft to assist a maintenance crew member in determining when the aircraft engine needs to be taken off wing and maintained or overhauled. For example, the display devices 508 may include an external handheld device, tablet, personal computer, etc.

For the embodiment depicted, the exemplary system 500 is configured as a computer-based system and the controller 502 includes a computing device 510 having one or more processor(s) 512 and associated memory device(s) 514. The computing device 510 is configured to perform a variety of computer-implemented functions to control the exemplary system 500. The computing device 510 can include a general purpose computer or a special purpose computer, or any other suitable computing device. It should be appreciated, that as used herein, the processor 512 may refer to a controller, a microcontroller, a microcomputer, a programmable logic controller (PLC), an application specific integrated circuit, and other programmable circuits. Additionally, the memory device(s) 514 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory 514 can store information accessible by processor(s) 512, including instructions that can be executed by processor(s) 512. For example, the instructions can be software or any set of instructions that when executed by the processor(s) 512, cause the processor(s) 512 to perform operations. For the embodiment depicted, the instructions include a software package 516 configured to operate the system 500 to, e.g., execute the exemplary methods (100), (300) described above with reference to FIG. 3 and FIG. 7.

In certain embodiments, the controller 502 (and computing device 510) may be connected to at least one of the sensors 504, the aircraft controls 505, the user input devices 506, and display devices 508 through a wired communication bus 518, or alternatively, through a wireless communication network. For example, the controller 502 including the computing device 510 may be wirelessly connected to the one or more sensors 504, the aircraft controls 505, the user input devices 506, and display devices 508 through a wireless communications network 520. Specifically, in certain exemplary embodiments, the controller 502 may be wirelessly connected using a wireless sensor network (such as a Bluetooth communication network), a wireless local area network (WLAN), a point-to point communication networks (such as radio frequency identification networks, near field communications networks, etc.), or a combination of two or more of the above communications networks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining an engine health factor of an aircraft engine comprising:
    determining, by one or more control devices, an engine condition indicative of an engine health during operation of the aircraft engine, the engine condition comprising a temperature value;
    accessing, by the one or more control devices, a baseline engine power model representative of a nominal aircraft engine with a nominal degradation;
    wherein the baseline engine power model indicates a relationship between an engine torque and a turbine temperature;
    modifying, by the one or more control devices, the baseline engine power model using the determined engine condition; and
    determining, by the one or more control devices, an engine health factor including a maximum engine torque of the aircraft engine based on the modified engine power model and a maximum turbine temperature.

2. The method of claim 1, wherein the engine health factor includes an engine torque factor.

3. The method of claim 2, wherein determining the engine condition indicative of an engine health comprises determining, by the one or more control devices, a plurality of engine condition values during operation of the aircraft engine, and wherein modifying the baseline engine power model using the determined engine condition comprises modifying, by the one or more control devices, the baseline engine power model using the plurality of engine condition values.

4. The method of claim 2, wherein the engine condition includes a plurality of torque values of the aircraft engine determined during operation of the aircraft engine.

5. The method of claim 4, further comprising
    correcting, by the one or more control devices, the plurality of torque values of the aircraft engine determined during operation of the aircraft engine to a normalized condition.

6. The method of claim 5, wherein the baseline engine power model of the aircraft is an engine torque to turbine inlet temperature model defining a baseline engine line.

7. The method of claim 6, wherein modifying the baseline engine power model includes plotting, by the one or more control devices, the plurality of corrected torque values and updating, by the one or more control devices, the baseline engine line to an updated engine line to reflect the plurality of corrected torque values.

8. The method of claim 7, wherein determining the engine torque factor based on the modified engine power model includes extrapolating, by the one or more control devices, a maximum engine torque available from the updated engine line.

9. The method of claim 1, further comprising
    determining, by the one or more control devices, a correction factor for the engine condition, and wherein modifying the baseline engine power model includes modifying, by the one or more control devices, the baseline engine power model using the determined engine condition and the correction factor.

10. The method of claim 9, wherein the correction factor incorporates one or more of a current icing factor or a current bleed air factor.

11. The method of claim 9, wherein the correction factor incorporates a current bleed air factor, and wherein the current bleed air factor is a binary bleed air factor.

12. A computing device comprising one or more processors and at least one tangible non-transitory computer-readable medium, the computer-readable medium storing instructions that when executed by the processor perform operations, the operations comprising:

determining an engine condition indicative of an engine health of an aircraft engine during operation of the aircraft engine, the engine condition comprising a temperature value;

accessing a baseline engine power model representative of a nominal aircraft engine with a nominal degradation;

wherein the baseline engine power model indicates a relationship between an engine torque and a turbine temperature;

modifying the baseline engine power model using the determined engine condition; and determining an engine health factor including a current maximum engine torque of the aircraft engine based on the modified engine power model and a maximum turbine temperature.

13. The computing device of claim 12, wherein the engine health factor includes an engine torque factor, and wherein the engine condition includes a plurality of torque values of the aircraft engine determined during operation of the aircraft engine.

14. The computing device of claim 13, wherein the operations further comprise:

correcting the plurality of torque values of the aircraft engine determined during operation of the aircraft engine to a normalized condition.

15. The computing device of claim 14, wherein the baseline engine power model of the aircraft is an engine torque to turbine inlet temperature model defining a baseline engine line.

16. The computing device of claim 15, wherein modifying the baseline engine power model includes plotting the plurality of corrected torque values and updating the baseline engine line to an updated engine line to reflect the plurality of corrected torque values, and wherein determining the engine torque factor based on the modified engine power model includes extrapolating a maximum engine torque available from the updated engine line.

17. A method for determining an engine health factor of an aircraft engine comprising the steps of:

determining, by one or more control devices, one or more engine limit factors during operation of the aircraft engine;

determining, by the one or more control devices, one or more ambient conditions;

correcting, by the one or more control devices, the one or more determined engine limit factors to a normalized condition;

determining, by the one or more control devices, a baseline engine health factor using a baseline engine power model, based on the one or more determined engine limit factors corrected to the normalized condition, wherein, the baseline engine health factor is representative of a nominal degradation of a nominal aircraft engine; and modifying, by the one or more control devices, the determined baseline engine health factor to a real-time engine health factor based on the determined ambient conditions, using a modified engine power model, wherein the modified engine power model is based on the baseline engine power model and the determined one or more engine limit factors;

wherein the steps of modifying comprise:

accessing, by the one or more control devices, a baseline engine power model for the aircraft engine which indicates a relationship between an engine torque and a turbine temperature;

modifying, by the one or more control devices, the baseline engine power model using the determined engine condition; and determining, by the one or more control devices, an engine health factor including a current maximum engine torque of the aircraft engine based on the modified engine power model and a maximum turbine temperature;

wherein it is determined whether the aircraft engine needs to be maintained or overhauled based on the current maximum engine torque.

18. The method of claim 17, wherein the engine health factor includes a measure of power available.

19. The method of claim 18, wherein correcting the one or more determined engine limit factors to a normalized condition includes correcting, by the one or more control devices, the one or more determined engine limit factors to a normal day condition based on the determined ambient conditions.

20. The method of claim 18, wherein the baseline engine health factor is a measure of power available at the normalized condition, and wherein the real-time engine health factor is a measure of the power available at the ambient conditions.

* * * * *